(No Model.) 2 Sheets—Sheet 1.
H. T. DAWSON.
GAS ENGINE.
No. 392,191. Patented Nov. 6, 1888.
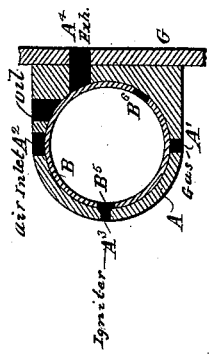
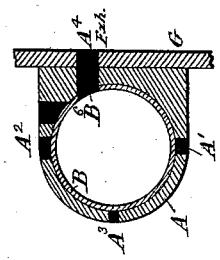
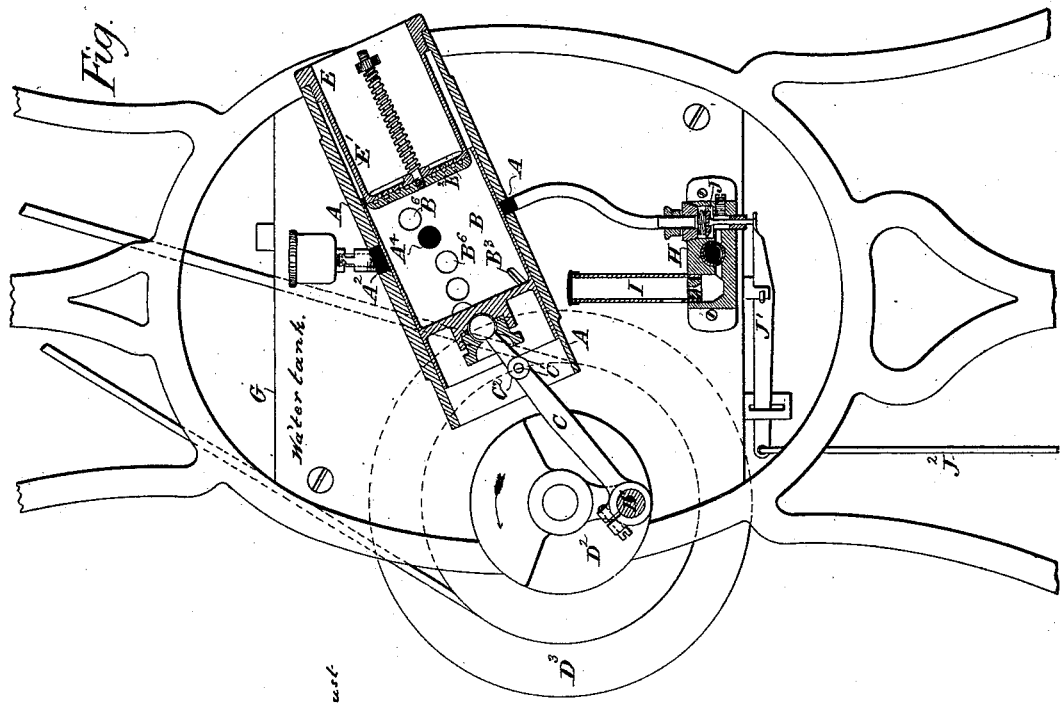
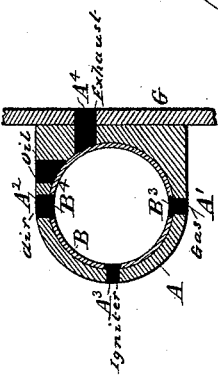
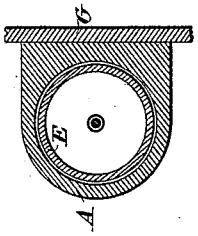
Witnesses  
Inventor:  
H. T. Dawson.

(No Model.) 2 Sheets—Sheet 2.
H. T. DAWSON.
GAS ENGINE.
No. 392,191. Patented Nov. 6, 1888.
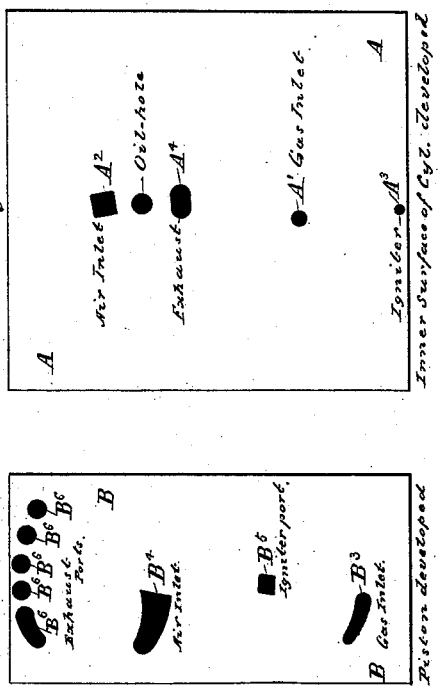
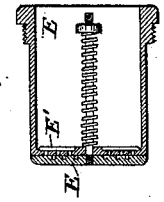
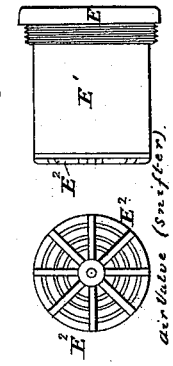
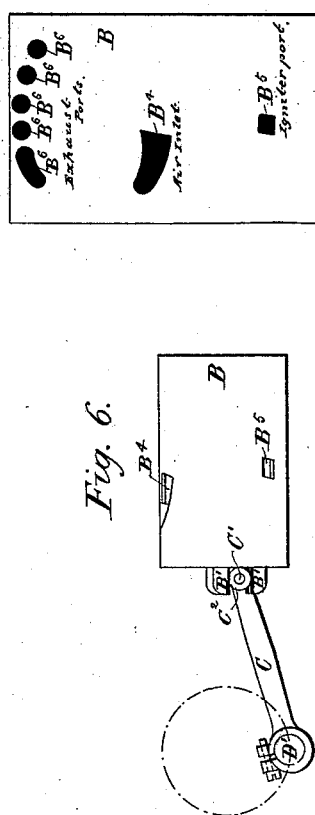
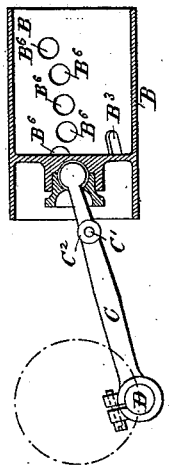
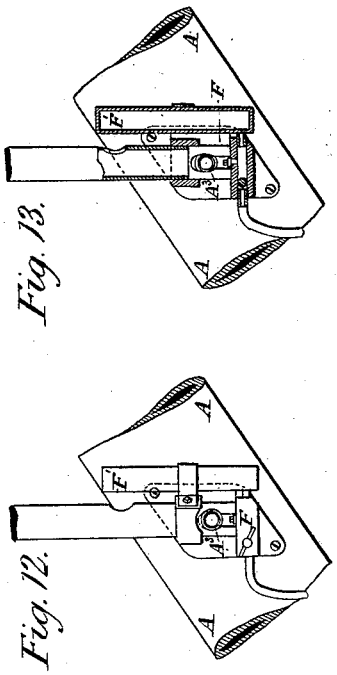
Witnesses.
Allan W. L. Abert.
Baltus D. Long.
Inventor:
H. T. Dawson,
By attys.
Baldwin, Hopkins & Peyton.
N. PETERS, Photo-Lithographer, Washington, D. C.

UNITED STATES PATENT OFFICE.

HENRY T. DAWSON, OF SALCOMBE, COUNTY OF DEVON, ENGLAND.

GAS-ENGINE.

SPECIFICATION forming part of Letters Patent No. 392,191, dated November 6, 1888.

Application filed November 15, 1887. Serial No. 255,214. (No model.) Patented in England June 30, 1885, No. 7,920.

*To all whom it may concern:*

Be it known that I, HENRY THOMAS DAWSON, a subject of the Queen of Great Britain, residing at Salcombe, in the county of Devon, England, gentleman, have invented certain new and useful Improvements in Gas-Engines, (for which I have received Letters Patent in Great Britain, No. 7,920, dated June 30, 1885,) of which the following is a specification.
This invention has for its object engines to be operated by the combustion of gas or gaseous fuel, and is applicable especially to engines to work at a high speed.

In the improved gas-engine the air and gas are admitted by separate apertures, and they are ignited before a complete admixture is effected. Such complete admixture, requiring time, is not allowed to take place by reason of the arrangement of the apertures and the speed at which the engine is driven. I employ a cylinder with a piston within it. The piston is elongated and fits the outer cylinder over the whole length of the piston. The piston contains within it a cylindrical chamber, in which the combustion of the gas takes place. This chamber is closed in front and open in rear. At the rear end of the outer cylinder there is a cover, and this carries a third cylinder projecting inward, and having its end in proximity to the closed end of the piston when this is at the inner end of its stroke. There are thus three concentric cylinders, one within the other—the outer fixed cylinder, the moving cylinder, forming part of the piston and fitting and sliding within the outer cylinder, and the cylinder attached to the cover, which projects within the second cylinder, but does not fit it closely. The combustion-chamber is the variable space within the moving cylinder between its closed end and the fore part of the cover. The combustion taking place within the moving chamber, the fire does not to any extent reach the frictional surfaces to which lubrication is applied. The piston is furnished with a connecting-rod, which is connected with it in front by a ball or other universal joint. The connecting-rod transmits the movement of the piston to a crank-pin carried by a shaft, which is also provided with a fly-wheel. The admission of gas and air to the combustion-chamber and the expulsion of the products of combustion take place by holes or passages formed through the sides of the stationary outer cylinder and the moving cylinder. One pair or set of holes or passages serves for the admission of gas or gas and air, a second for that of air alone, a third for firing the charge, and a fourth for the expulsion of the products of combustion. When the piston is at the inner end of its stroke, a hole or passage in the side of the moving cylinder coincides with another hole or passage in the outer cylinder, to which gas or gas and air are supplied by means of a pipe or pipes. Another hole in the moving cylinder coincides, also, at this time with a hole in the opposite side of the outer cylinder, by which air enters. When a portion of the stroke has been completed, these holes or passages cease to coincide, and the admission of gas and air by these ports consequently ceases. Immediately another hole in the moving cylinder arrives at a position in which it coincides with a vent in the side of the outer cylinder, where a flame is kept constantly burning. The charge of gas and air in the moving cylinder is then ignited, and the combustion causes an expansion, which drives the piston to the end of its stroke. During the return-stroke the admission and ignition passages in the two cylinders do not again come together, because a partial rotary motion is imparted to the piston and moving cylinder by means hereinafter described. In the return-stroke, however, the exhaust-apertures in the moving cylinder coincide with a corresponding passage in the outer cylinder, and the products of combustion are free to escape. The exhaust is open throughout the whole of the return-stroke, the exit in the moving cylinder taking the form of a series of holes, which in close succession are brought to correspond with the exit-passage upon the outer cylinder. It will thus be seen that the moving cylinder serves also as the valve by which the flow of the gas, air, and products of combustion is controlled. The piston may receive the necessary rotative axial movement very conveniently by means of an arm upon the connecting-rod at a short distance from the end connected with the piston. This arm enters between two lugs upon the piston near its periphery. It carries a cylinder or ball, which works between these lugs and insures steady movement. The angular motion which the connecting-rod receives from the crank thus causes partial rotation or oscillation of the piston, such that, as already explained, the holes in the sides of the moving cylinder take a different path during the return-stroke from that over which they travel during the outward or effective stroke.

I provide an air-valve on the cylinder-cover which opens to admit air into the cylinder both while the admission-ports are open and after they have closed; but it closes when the gases are fired to prevent an escape outward. The object of this valve is to reduce the suction upon the igniting-flame, as strong suction is fatal to rapid action. The valve should be so constructed as to give a free admission while rising only a very short distance from its seat, as it is necessary that it should close very promptly when the gases are fired. This valve may conveniently consist of a series of concentric rings, all of a piece and connected together by radial ribs. The cylinder-cover is similarly formed, and the apertures between the rings of the cover are closed by the rings of the valve. The valve is held up to its seat by a light spring.

The gas is supplied to the engine from a flexible bag contained in a cavity in the base where the bag is safe from injury. The gas enters the bag from an ordinary gas-pipe past a cock which can be closed to cut off the supply of gas when desired. On leaving the bag the gas enters a valve-box in which there is a small stop-valve. This valve when upon its seat will still allow a small quantity of gas to pass, sufficient to keep the engine in movement at a convenient rate when unloaded. When the work is thrown upon the engine, this stop-valve is at the same time lifted. This is effected by means of a lever operating upon the valve and connected also with the starting and stopping gear of the machine which the gas-engine is adapted to drive. Thus on the machine being started the engine receives a full supply of gas, and when the machine is stopped the gas-supply to the engine is checked, and only so much passes as is necessary to keep the motor in movement. There is also a tap to regulate the gas after it has passed the stop-valve, and this tap serves to fix the maximum speed of the engine.

I provide a burner for the purpose of warming the cylinders before starting, as the engine does not run well when cold, especially when solid lubricants are used. This burner I supply with gas from the same valve-box, and the regulating tap which controls the maximum flow of gas will serve also to regulate the supply of gas to this burner. The flame from the burner, playing on the outer cylinder, soon raises the apparatus to a suitable working temperature. The engine works best when the cylinders are heated to about 300°, and to prevent the temperature much exceeding this when the engine is put to continuous work I provide a small water-cistern in connection with the frame. The frame conducts away the surplus heat and communicates it to the water. The ignition of the gas within the cylinder is effected by means of a small gas-flame contained within a tube which protects it from drafts. This flame plays against a small perforated earthenware button let into the side of the outer cylinder. This perforation forms the firing-vent. The ignition of the charge takes place when a hole in the side of the moving cylinder comes to coincide with the vent. The slight indraft then carries the flame through the vent into the cylinder, and the charge is ignited. I form the vent in earthenware or like non-conducting material in order that the flame in passing through may not be so far cooled as to cause the ignition to fail. I supply the igniting-flame by a pipe direct from the gas-supply pipe, and I also provide a second flame immediately above the igniting-flame, so that if the first should in any case be blown out it may be immediately lighted again and ready to act on the next stroke of the engine.

For domestic purposes the gas-engine may be inclosed in a box lined with felt or other non-conducting material to deaden any noise which may result from its working. A tube may be provided to supply cool air from outside to the large air-valve. In order to insure an effective ignition of the charge, I provide a deflecting-plate upon the piston. I usually so arrange this plate as to direct the gas entering the cylinder away from the igniting-aperture, in order that the ignition may not fail from an excess of gas being found at this point. It may also in some cases be required to deflect the air from the ignition-aperture. The lubrication of the piston may be effected by means of an ordinary siphon-lubricator mounted on the side of the outer cylinder in such a manner that any gases leaking past the piston are able to find vent otherwise than by the tube of the lubricator, so that the wick of the lubricator may not be displaced by gas-pressure. Solid paraffine is a suitable lubricant.

In order that my said invention may be most fully understood and readily carried into effect, I will proceed to describe the drawings hereunto annexed.

Figure 1 is a longitudinal section of the gas-engine. Figs. 2, 3, 4, and 5 are transverse sections. Fig. 6 is an elevation, and Fig. 7 is a longitudinal section, of the piston and its connecting-rod. Fig. 8 represents the surface of the piston developed and shows the ports therein. Fig. 9 represents a development of the inner surface of the cylinder. Fig. 10 is a side elevation, Fig. 10ˣ an end elevation, and Fig. 11 a longitudinal section, of the cylinder-cover with the hollow cylindrical projection forming a part thereof, and also the valve which this part carries. Figs. 12 and 13 show the burner by which the ignition is effected with its chimney and relighting-jet.

A is the main cylinder fixed to the frame of the engine.

B is the piston. It is of cylindrical form and partly hollow. It works gas-tight within the cylinder A. Between its surface and that of the cylinder paraffine or other lubricant is applied.

C is a connecting-rod. A ball-and-socket joint connects it at one end with the piston and at the other end it is jointed to a crank-pin, D', on the face of the disk $D^2$ on the main shaft D of the engine, on which a fly-wheel, $D^3$, is also carried. There is an arm, C', projecting from the side of the connecting-rod. It terminates in a stud on which the globular roller $C^2$ is mounted, so as to be able to turn freely, and it can also travel endwise along the stud. This roller is received between two jaws, B' B', attached to the piston B. From this construction it results that the piston in moving to and fro within the cylinder also partially rotates.

E is the end cover of the cylinder A, and E' is the hollow cylindrical projection upon it, entering within the interior of the hollow piston B. The end of the projection E' and the piston B, with its hollow cylindrical sides, inclose between them the combustion-chamber or space in which the gas is burned. In the end of the projection E' a series of annular slits are formed, as is clearly shown by Fig. 11, and these are closed by a plate or valve, $E^2$, in which similar slits are formed, and which by a light spring is held up to the surface of E'. Whenever, however, the pressure within the combustion-chamber falls below atmospheric pressure, as it does when the ports are closing, the valve lifts slightly from its seat and allows air to enter. The admission of air by this valve serves several purposes. It furnishes some portion of the charge for use in the combustion-chamber; but this is not its main object, for another inlet is provided to do this, which is opened and closed mechanically at proper times. The air admitted by this valve also lessens the resistance against which the engine works during the outstroke and before the charge is fired. It cools the cylinder, and, finally, its main object is to prevent too great an inrush of air taking place at the firing-port, which would at high speed interfere with the ignition of the charge when the firing-port is opened. This light suction is essential to high speed in the engine, and is best attained, as herein shown, by means of a valve of large area in free communication with the cylinder and operating independently of the main admission of air to consume the gas of the charge.

The gas enters the combustion-chamber from a bag by the passage A' in the side of the cylinder A at the time when this passage corresponds with another passage, $B^3$, in the side of the cylindrical piston B. A valve is shown in connection with the gas-supply passage A'. It can be opened or closed by a treadle or in other convenient manner. In place of admitting gas alone by these passages A' and $B^3$, gas and air may be supplied. The combustion-chamber is also simultaneously supplied with air alone through the passage $A^2$ in the cylinder A and the passage $B^4$ in the cylindrical piston B.

The section Fig. 4 shows the parts in the position which they occupy as the charge enters the combustion-chamber. It is a feature in this engine that it requires no separate gas-inlet, exhaust, and ignition valves.

F is the burner by which the ignition is effected. It supplies simply a small gas-flame, which plays continuously against a perforated earthenware button fixed into an aperture at $A^3$ in the side of the cylinder A. Above the igniting-burner a small gas-flame is kept constantly burning at F', to relight the igniting-flame if, as may sometimes occur, it should be blown out. $B^5$ is the igniting-aperture in the side of the cylindrical piston B. As soon as this comes to coincide with the aperture $A^3$, the charge in the combustion-chamber is fired. Fig. 2 shows the parts in this position. The piston then receives an impulse forward, which is communicated to the crank and fly-wheel. The piston now passes to the end of its stroke and returns. During the return of the piston the products of combustion are in great part discharged out of the cylinder. The passages $B^6$ in the piston B come in position to coincide with the exit-passage $A^4$ in the side of the cylinder A.

Fig. 3 shows the parts when, during the return-stroke, the passages are open for the escape of the products of combustion.

G is a water-cistern formed in connection with the frame of the engine. It is employed in order to prevent the parts from becoming overheated; but, as already stated, the engine works more advantageously when fairly hot than when cold.

H is a gas-tap, which serves to control the supply of gas to the engine; also, when the engine is not at work it can be used to turn gas on to the burner I, which is for warming up the cylinder before starting. The supply of gas to the engine is drawn, as is usual, from a flexible bag, by which greater uniformity is obtainable than when the gas is taken from the gas-supply pipe direct.

J is a valve operated by a lever, J', and a rod, $J^2$, leading to a treadle. The same treadle also operates a friction-clutch, by which the machine to be driven is connected with the engine. When the machine is unclutched, the valve J is closed, so as only to pass just enough gas to keep the engine in motion. When the treadle is released, the clutch drops in and the valve J is opened by a spring.

Having now particularly described and ascertained the nature of my said invention and in what manner the same is to be performed, I declare that what I claim is—

1. The combination, in a gas-engine, of the cylinder, the piston within the cylinder, the shaft with the crank-pin, the connecting-rod between said crank-pin and the piston, the ball-and-socket joint between the piston and the connecting-rod, the roller-carrying arm of the connecting-rod, by way of which a partial rotary motion to and fro is imparted to the piston, and the ports or passages in the sides of the cylinder and piston for admitting gas and air, substantially as and for the purpose set forth.

2. The combination of the cylinder, the piston moving longitudinally and partially rotating within the cylinder, the side ports or passages in the cylinder and piston for admitting gas and air to the combustion-chamber within the piston, the cover having the hollow cylindrical projection entering within the piston, and provided at its inner end with slits, the similarly-slitted valve-plate, and the spring acting thereon, substantially as and for the purpose set forth.

HENRY T. DAWSON.

Witnesses:
JOHN S. HURRELL,
*Solcr., Not. Pub., Kingsbridge, Devon.*
SAMUEL SHILLABEER,
*His Clerk.*